United States Patent [19]
Noritomi

[11] Patent Number: 5,805,764
[45] Date of Patent: Sep. 8, 1998

[54] DATA TRANSMITTING APPARATUS

[75] Inventor: Masami Noritomi, Kanagawa, Japan

[73] Assignee: Sony Corporation, Tokyo, Japan

[21] Appl. No.: 750,206

[22] PCT Filed: Mar. 25, 1996

[86] PCT No.: PCT/JP96/00768

§ 371 Date: Mar. 7, 1997

§ 102(e) Date: Mar. 7, 1997

[87] PCT Pub. No.: WO96/31052

PCT Pub. Date: Oct. 3, 1996

[30] Foreign Application Priority Data

Mar. 24, 1995 [JP] Japan ................................. 7-066399

[51] Int. Cl.[6] ............................ H04N 5/91; H04N 5/911
[52] U.S. Cl. ............................ 386/96; 386/113; 386/114
[58] Field of Search ................................. 386/96, 47, 49, 386/113, 114, 2, 21, 22, 95, 39; 360/31, 53, 18, 32; H04N 5/91, 5/911

[56] References Cited

U.S. PATENT DOCUMENTS

| | | | |
|---|---|---|---|
| 5,414,568 | 5/1995 | Taki et al. | 360/19.1 |
| 5,483,389 | 1/1996 | Karasawa | 360/53 |
| 5,499,147 | 3/1996 | Tsai et al. | 360/53 |
| 5,587,807 | 12/1996 | Ootsuka et al. | 386/46 |

FOREIGN PATENT DOCUMENTS

| | | |
|---|---|---|
| 56-68976 | 6/1981 | Japan . |
| 58-153285 | 9/1983 | Japan . |
| 5-183860 | 7/1993 | Japan . |

*Primary Examiner*—Robert Chevalier
*Attorney, Agent, or Firm*—Frommer Lawrence & Haug LLP; William S. Frommer

[57] ABSTRACT

A data transmitting apparatus which can reduce the load of the work of checking the AV data by the operator. AV data reproduced by a CM library (230) is recorded in a first cache (340) and second cache (350) via a distributor (330). At this time, the check sum regarding the AV data as the numerical value data is found in the calculating unit inside the CM library (230) and sent to a cache processing unit (310) via a library processing unit (210). The AV data recorded in said two caches are respectively subjected to test reproduction and the check sums are found by the calculating unit in each cache similar to the above. Where these check sums are all equal, it is decided that the transfer of the AV data was suitably carried out. Also, the AV data having a lower error rate between the AV data reproduced by the two caches is selected by the main switcher (400) and transmitted.

8 Claims, 7 Drawing Sheets

FIG. 7

DATA TRANSMITTING APPARATUS

TECHNICAL FIELD

The present invention relates to a data transmitting apparatus which temporarily transfers audio data and/or video data (AV data) comprising audio data and video data stored in a library etc. to a predetermined recording apparatus and performs the transmission of that AV data using that transferred data.

BACKGROUND ART

In a broadcasting station, broadcast program data, for example commercials(CM) programs, etc. is usually stored in a library. The necessary broadcast program data is successively selected, reproduced, and transmitted from that library according to a broadcast schedule. This series of processing is controlled and managed by a control means called a library management system (LMS). U sing this LMS, a library having data on an enormous number of CM programs recorded in a very large number of recording media, for example, several thousand video cassette tapes, is managed and suitably used for broadcasting CM programs.

However, usually, in a broadcasting station, to prevent any interruption of the broadcast, the system is configured so that important apparatuses such as said library are duplicated, and even if one breaks down, operation by the other is possible. However, such duplex provisions require double the cost. In particular, duplication of large scale apparatus such as said library for CM programs has a great economic influence.

Further, in such a multiplexed library system, it is necessary to select one series of data for actual broadcasting from the plurality of broadcast program data output. Normally, this selection is performed by the switching operator viewing the monitor to check the quality of the video and audio at the main switcher, but this work places a heavy burden on the switching operator.

DISCLOSURE OF THE INVENTION

The present invention has as its object to provide such a data transmitting apparatus for transmitting broadcast program data such as for CM programs which can ensure the same extent of reliability as that by the duplex provisions of a library by a simpler configuration, in other words, a lower cost. Further, it has as its object the provision of an apparatus which can eliminate or reduce the checking of the AV data by the operator and thereby lighten the work load.

In recent years, AV data is also being digitalized and broadcast program data is being recorded as digital data in a library etc. in many cases. If the broadcast program data is digital data, techniques such as error detection codes (error correction codes) which are often used in data transmission etc. can be applied. Namely, by comparing the error detection codes produced with respect to AV data before and after the transfer, whether or not the AV data are equivalent can be checked. Further, it is possible the check the quality of the AV data by using the error rate and therefore upgrade the reliability.

Accordingly, a data transmitting apparatus of the present invention comprises a reproducing means for storing AV data comprised of at least one of video data and audio data and reproducing the stored AV data, a temporary recording means for temporarily recording the AV data reproduced by said reproducing means, a control means for controlling said reproducing means and said temporary recording means, a first error state detecting means for detecting an error state of the AV data reproduced by said reproducing means and outputting a first error detection signal, a second error state detecting means for detecting an error state of the AV data reproduced by said temporary recording means and outputting a second error detection signal, a transfer checking means for deciding that the transfer of the AV data from said reproducing means to said temporary recording means was suitably carried out when said first error detection signal and said second error detection signal are equal, and a data transmitting means for reproducing and transmitting the AV data suitably transferred to and recorded in said temporary recording means.

Preferably, when said transfer checking means decides that said first error detection signal and said second error detection signal are different, said control means controls said reproducing means and said temporary recording means so as to again carry out the transfer of said AV data from said reproducing means to said temporary recording means.

Specifically, it further comprises an input means for inputting transmission scheduling data showing the transmission schedule of said AV data, and said control means controls said reproducing means and said temporary recording means based on said transmission scheduling data so that said data is transferred from said reproducing means to said temporary recording means before the scheduled time of broadcast of said AV data.

More preferably, it comprises a first transmission line connecting said reproducing means and said temporary recording means and a second transmission line connecting the first error state detecting means and the transfer checking means, and the second error state detecting means and the transfer checking means each, on the first transmission line being transmitted fixed length data packets having a first data portion including the video data for each horizontal line's worth of the video data and a second data portion including the audio data corresponding to the video data and predetermined auxiliary data, and on the second transmission line being transmitted at least said first error detection signal and said second error detection signal.

Specifically, said first transmission line is a transmission line which can transmit said AV data by a first transmission rate, and said second transmission line is a transmission line which can transmit said first error detection signal and said second error detection signal at a second transmission rate slower than said first transmission rate.

More preferably, said temporary recording means comprises a plurality of recording means, said control means controls said reproducing means and said temporary recording means so that the same data reproduced by said reproducing means is recorded in each of said plurality of recording means, said second error detecting means detects said error state for each of the AV data reproduced by said plurality of recording means and outputs a plurality of second error detection signals, and said transfer checking means decides that the transfer of the AV data from said reproducing means to said temporary recording means has been suitably performed when the first error detection signal and the plurality of second error detection signals are all equal.

Preferably, said data transmitting means comprises a data selecting means for selecting and transmitting one series of AV data from a plurality of series of AV data reproduced by said plurality of recording means under the control of said control means.

More preferably, said data selecting means comprises an error rate detecting means for detecting the error rates of each of the AV data reproduced by the plurality of recording means and the AV data with the lowest error rate is selected based on the results of detection of said error rate detecting means.

In such a data transmitting apparatus of the present invention, the library means storing a plurality of types of AV data preliminarily reproduces and outputs the AV data scheduled to be transmitted and records it in the temporary recording means. At this time, a predetermined error detection code is found in the first code computing means for the AV data reproduced in the library means. Also, the AV data recorded in the temporary recording means is immediately subjected to test reproduction and a predetermined error detection code the same as that of said first code computing means is found by the second code computing means. Then, the error detection code found by said first code computing means and the error detection code found by said second code computing means are compared by the transfer check means. Where they are equal, it is decided that the transfer of the AV data from said library means to said temporary recording means was suitably carried out. The suitably transferred AV data is suitably reproduced and transmitted in accordance with the request.

BRIEF DESCRIPTION OF DRAWINGS

The above object and features of the present invention will become more apparent from the following description with reference to the accompanying drawings, wherein.

BEST MODE FOR CARRYING OUT THE INVENTION

First Embodiment

A first embodiment of the data transmitting apparatus of the present invention will be explained referring to FIG. 1.

The data transmitting apparatus of the present embodiment is a commercial (CM) program transmitting apparatus used in the broadcasting station. The apparatus copies the CM programs scheduled to be transmitted among a large amount of CM programs stored in the library in a temporary recording unit called a "cache" and performs the actual transmitting by using the CM program data copied in that cache as the transmission data.

Figure 1:
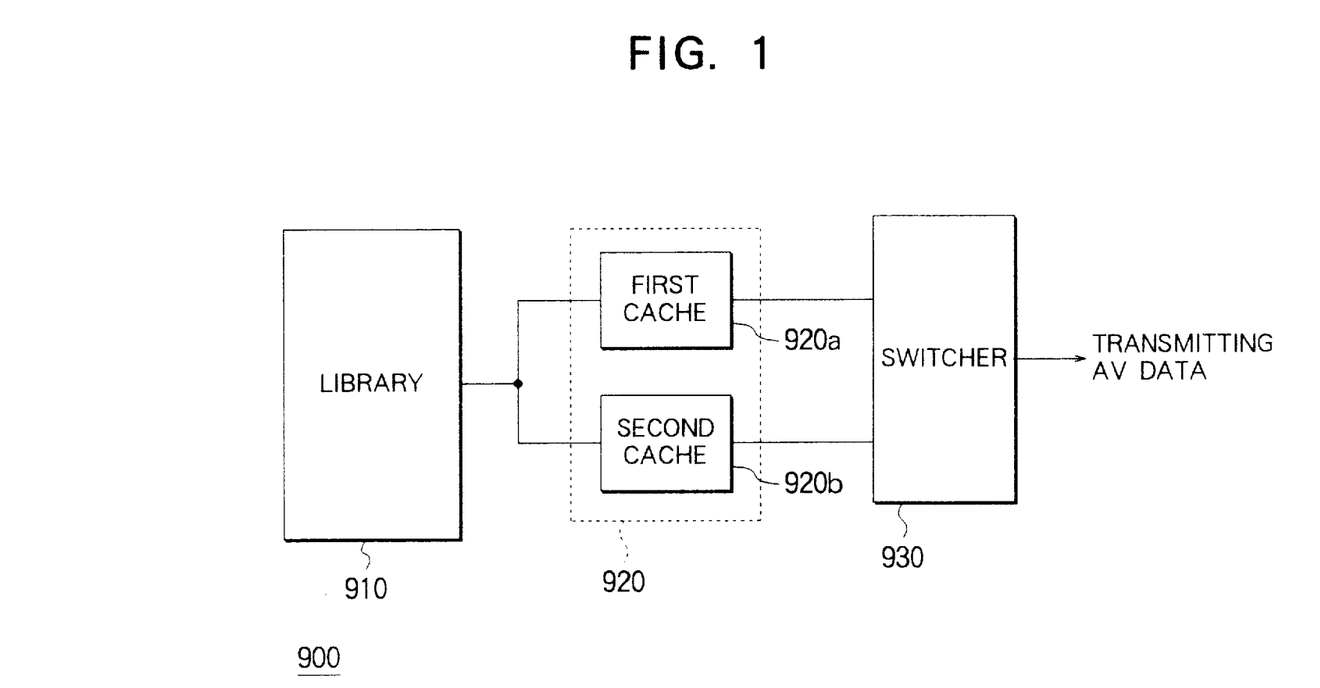
FIG. 1 is a block diagram of the configuration of a data transmitting apparatus of a first embodiment of the present invention.

FIG. 1 is a block diagram of the configuration of a data transmitting apparatus of the present embodiment.

A data transmitting apparatus 900 comprises a library 910, a temporary recording device 920, and a switcher 930.

The library 910 comprises a large amount of video tapes on which CM programs are stored, a reproducing unit for reproducing from the video tapes, and a media changer for suitably automatically exchanging and setting in the reproducing unit the video tapes and reproduces and outputs the requested CM program data.

The temporary recording device 920 comprises a first cache 920a and a second cache 920b and records the CM program data input from the library 910 on these two caches in the same way. In accordance with the broadcast schedule, the recorded CM program data is simultaneously reproduced at these two caches and output to the switcher 930. Note that the first cache 920a and the second cache 920b are each separate hard magnetic disk apparatuses.

The switcher 930 selects and transmits one series of data from the two identical series of CM program data input from the temporary recording apparatus 920. The selection of the transmission data at this time is performed by the operator checking the two series of CM program data input on a monitor. However, so long as no breakdown etc. occurs, the two series of CM program data are input suitably and either one of the series of data can be freely selected.

In the data transmitting apparatus 900, the data scheduled to be transmitted for about the next one week are transferred to the temporary storage apparatus 920 from the CM program data stored in the library 910. The actual transmission of the CM program data is performed using the AV data recorded in the temporary recording apparatus 920.

By using this configuration, the recording apparatuses are duplicated for the AV data scheduled to be transmitted for a while, so even if one recording apparatus broke down, it was possible to transmit the CM program data using the other recording apparatus immediately and therefore secure the same level of reliability as with provision of two libraries as mentioned above. Further, with such a configuration of a data transmitting apparatus, the system can be configured cheaper than the case of provision of two of the libraries themselves.

Second Embodiment

However, in the data transmitting apparatus of the first embodiment, the operator had to check the AV data which was transferred and reproduced. For example, when CM program data was transferred from the library to the temporary recording apparatus, it was necessary to check if the transfer had been performed suitably. The operator had to reproduce the AV data recorded in the temporary recording apparatus and check the quality of the picture and sound on a monitor etc. Therefore, in the data transmitting apparatus of the first embodiment, it was not possible to lighten the work load of the manager or operator.

An explanation will be made of a data transmitting apparatus able to solve problems and lighten the work load of the operator as a second embodiment referring to FIG. 2 to FIG. 7.

The data transmitting apparatus of the second embodiment is also CM program transmitting apparatus using at broadcasting station the same as the first embodiment.

Figure 2:
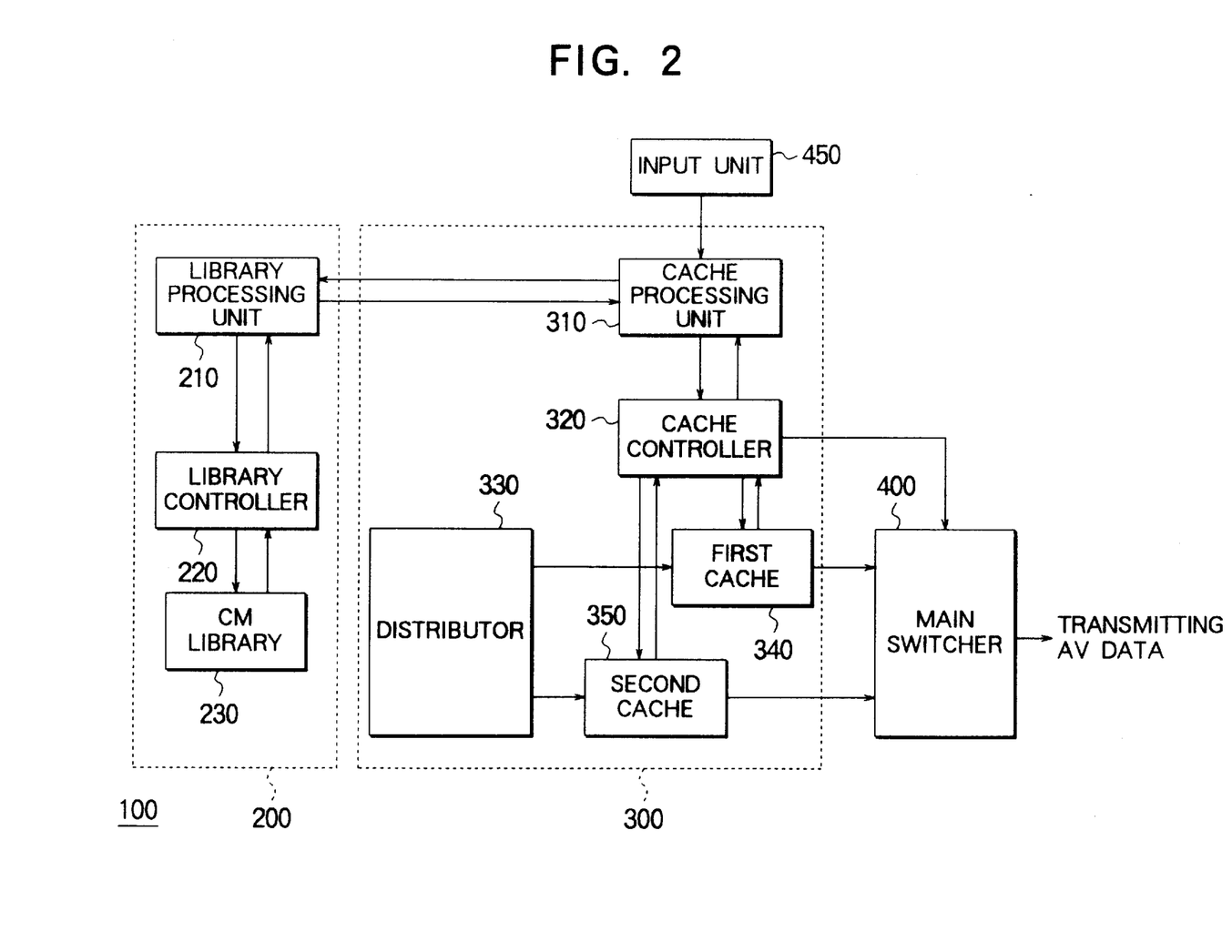
FIG. 2 is a block diagram of the configuration of a data transmitting apparatus of a second embodiment of the present invention.

FIG. 2 is a block diagram of the configuration of the data transmitting apparatus.

The data transmitting apparatus 100 comprises a library unit 200, a cache unit 300, a main switcher 400, and an input unit 450.

First, an explanation will be made of the configuration and function of the respective portions.

First, the configuration and function of the portions of the library unit 200 will be explained.

The library unit 200 comprises a library processing unit 210, a library controller 220, and a CM library 230.

The library processing unit 210 is constituted by a general purpose computer etc. and controls the library unit 200 as a whole.

The library processing unit 210 controls the CM library 230 through the library controller 220 so as to read the data of the predetermined CM program from video tapes 500-i (i=1 to m) stored in the CM library 230 based on instructions for copying the CM program data input from the cache processing unit 310 of the cache unit 300 mentioned later and output the same to the cache unit 300.

More specifically, it outputs information of the video tape on which the data of the desired CM program is recorded and a signal instructing the reproduction thereof to the library controller 220. Also, it receives as its input the error detection code obtained at the reproduction of the CM program data from the library controller 220 and outputs the same to the cache processing unit 310 of the cache unit 300.

The library controller 220 actually controls the specific operation of the CM library 230 based on the instructions input from the library processing unit 210. More specifically, it instructs the identification number of the video tape to be reproduced, the location for reproduction in that tape, and the reproducing unit for reproducing to the CM library 230 and executes the reproduction of the desired CM program. Also, it outputs the error detection code at the time of the reproduction, output from the CM library 230, to the library processing unit 210.

The CM library 230 selects and reproduces the cassette tape in which the desired CM program are recorded from a large number of cassette tapes in which CM programs are stored, outputs the desired programs to the cache unit 300, and, at the same time, outputs the error detection code at the time of reproduction to the library controller 220.

Figure 3:
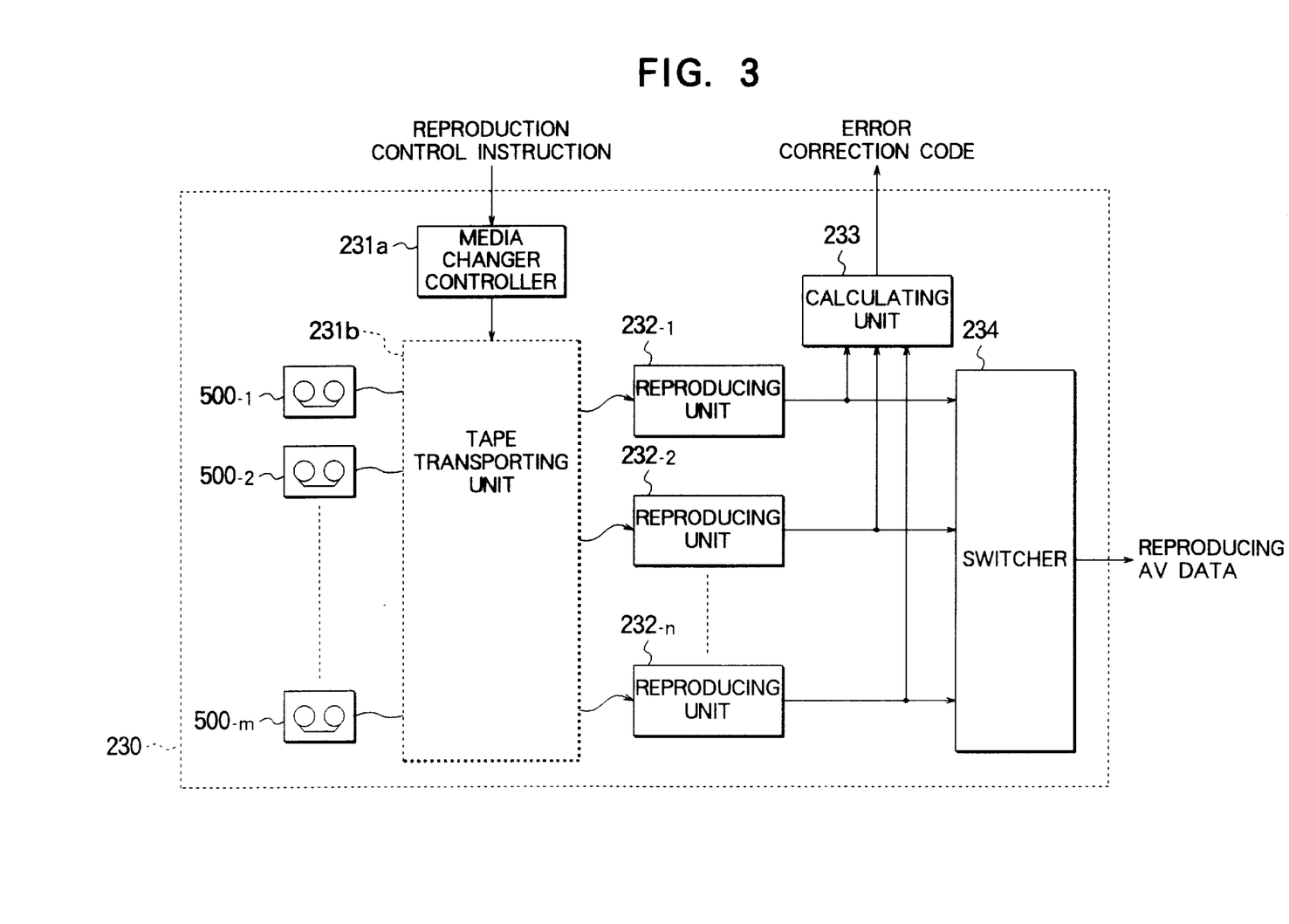
FIG. 3 is a block diagram of the configuration of a library of the data transmitting apparatus shown in FIG. 2.

A detailed explanation will be made of the configuration of the CM library 230 by referring to FIG. 3.

The CM library 230 comprises a media changer 231, n number of reproducing units 232-j (j=1 to n), a calculating unit 233, and a switcher 234 and further comprises m number of video tapes 500-i (i=1 to m) in which the CM programs are recorded and stored.

The video tapes 500-i (i=1 to m) are recording medium in which the CM program data is actually recorded. In the video tapes 500-i, the CM program data is recorded in the form of digital data. Note that, usually one CM library 230 will handle about 500 to 1000 video tapes. Also, these video tapes are stored at predetermined positions of rack-shaped storage cabinets and are automatically set in the reproducing units 232-j and removed from the reproducing units 232-j by the media changer 231 mentioned later.

The media changer 231 selects a video tape 500-i (i=1 to m) in which a desired CM program is recorded from m number of video tapes 500-i to 500-m stored in the CM library 230 and sets that video tape 500-i in a predetermined reproducing unit 232-j (j=1 to n). The media changer 231 comprises a tape transporting unit 231b for actually transporting the tape and setting it in the reproducing unit 232-j and a media changer control unit 231a for controlling the tape transporting unit 231b. The information of the video tape 500-j selected and the reproducing unit 232-i in which it is set is informed from the library controller 220 to the media changer control unit 231a. Further, when the reproduction of the set video tape 500-i ends, the tape transporting unit 231b removes the video tape 500-i from the reproducing unit 232-j and returns the same to the original predetermined storage position.

The n number of reproducing units 232-1 to 232-n each have set in them video tapes 500-i by the media changer 231. Based on an instruction from the library controller 220, the video tape 500-i is reproduced from the reproducing units 232-j and that program data is output to the calculating unit 233 and the switcher 234.

The calculating unit 233 regards the reproduced CM program data as usual binary data and sequentially adds it to calculate the check sum. The calculated check sum is output to the library controller 220. In this embodiment, the 15 frames AV data of the AV data of the format mentioned later are all added to find the check sum. That is, one check sum is found and output for every 15 frames.

The switcher 234 selects one of the n number of reproducing units 232-1 to 232-n based on the instruction from the library controller 220 and outputs this as the reproduced AV data from the CM library 230.

Here, an explanation will be made of the format of the program data at the time of reproduction at the library unit 200 and transfer to the cache unit 300 referring to FIG. 4.

The data transmitting apparatus 100 of the present embodiment transfers the AV data based on the serial data interface (SDI) system. The SDI system is a format standardized as SMPTE-295M by the SMPTE (Society of Motion Picture and Television Engineering).

Figure 4A:
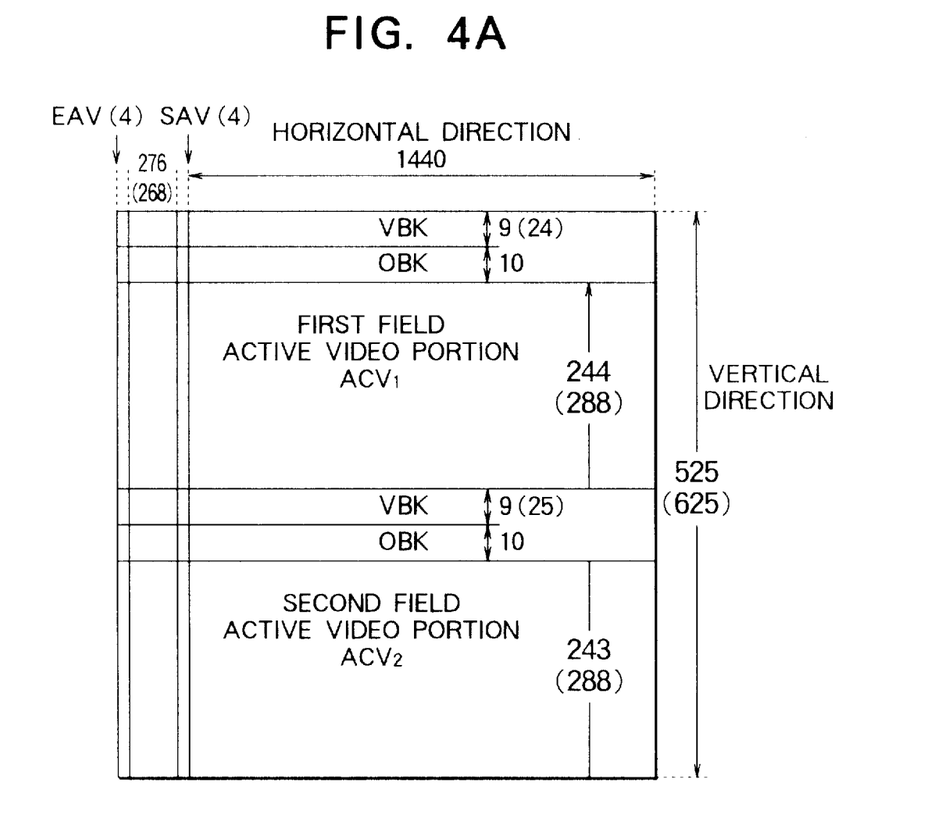
FIG. 4A is a view for explaining the format of AV data processed by the data transmitting apparatus shown in FIG. 2.
Figure 4B:
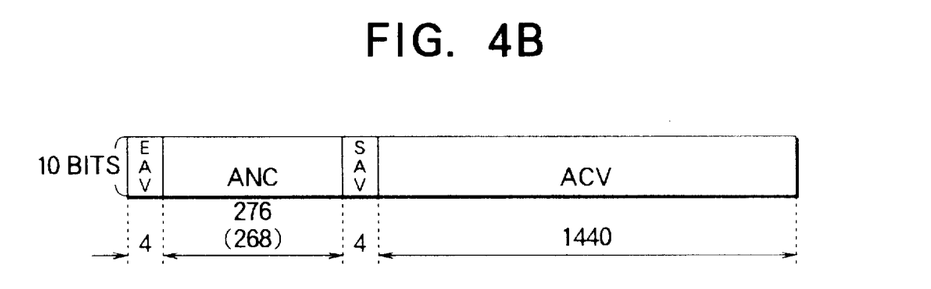
FIG. 4B is a view for explaining the transfer packets of AV data of the format shown in FIG. 4A.

FIG. 4A is a view of the configuration of a frame of the AV data (video signal) of the SDI system, while FIG. 4B is a view of the configuration of a transfer packet of the SDI system.

The frame of a video signal of the SDI system, as shown in FIG. 4A and FIG. 4B, is constructed of 525 or 625 lines in the vertical direction (hereinafter, the specific number of the system which has 625 lines in the vertical direction is showed in parentheses) and 10 bits×1724 (1716) words per line in the horizontal direction.

In each line, the first word to the fourth word of the line show the end of the active video portion ACV and are used for separating code EAV (End of Active Video) separating the active video portion ACV and the ancillary data portion ANC. The 276 (268) words from the fifth word to the 280th (272) word are used as the ancillary data portion ANC which is used for the supplementary data and the audio data etc. The four words from the 281st (273) word to the 284th (276) word show the start of the active video portion ACV and are used for separating code SAV (Start of Active Video) separating the active video portion ACV and the ancillary portion ANC. The 1440 words from the 285th (277) word to the 1724th (1716) word are used as the active video portion ACV for transmitting the video signal etc.

Further, as shown in FIG. 4A, in the vertical direction, the nine (24) lines from the first line to the ninth (24) line are used as the vertical blanking portion VBK. The 10 lines from the 10th line to the 19th line is used as the optional blanking portion OBK. The 244 (288) lines from the 20th (25) line to the 263rd (312) line are used as the active video portion $ACV_1$ of the first field. The active video portion $ACV_1$ of the first field includes the video signal of the first field.

The nine (25) lines from the 264th (313) line to the 272nd (337) line are used as the vertical blanking portion VBK.

The 10 lines from the 273rd line to the 282nd line is used as the optional blanking portion OBK. The 243 (288) lines from the 283rd (338) line to the 526th (625) line are used as the active video portion $ACV_2$ of the second field. The active video portion $ACV_2$ of the second field includes the video signal of the second field.

The video signal of the SDI system of this frame configuration is converted into transmission signals of a serial format of for example 270 Mbps, and sent and received among the portions of the data transmitting apparatus 100 converted into transmission signals of a serial format of for example 270 Mbps.

Further, as explained above, the calculating unit 233 calculates the check sum for every 15 frames worth of data of the SDI data of this configuration.

Next, an explanation will be made of the configuration and function of the cache unit 300.

The cache unit 300 shown in FIG. 2 comprises a cache processing unit 310, a cache controller 320, distributor 330, a first cache 340, and a second cache 350.

The cache processing unit 310 is constituted by a general purpose computer etc. and controls the entire cache unit 300 so as to suitably record and transmit the CM program data input from the library unit 200. In particular, according to the present invention, it controls the each of portions of the cache unit 300 so that the transfer of the CM program data from the library unit 200 to the cache unit 300 and the transmission of the CM program data from the cache unit 300 to the main switcher 400 are suitably carried out.

More specifically, the cache processing unit 300 controls each of the portions so that the cache unit 300 carries out the following operations:

Further, it records the CM program data input from the library unit 200 via the distributor 330 in the first cache 340 and the second cache 350.

Next, it decides whether or not the transfer of the CM program data from the library unit 200 to the cache unit 300 was suitable.

For this purpose, the cache processing unit 310 first causes a test reproduction of the recorded CM program data and makes the computing units in the first cache 340 and the second cache 350 calculate a check sum when regarding the respectively test-reproduced CM program data as numerical value data. Also, the cache processing unit 310 reads the check sums and determines whether or not they coincide with the check sum input from the library unit 200. Where the check sum of the result of even one of the test reproductions of the first cache 340 or the second cache 350 does not coincide with the check sum input from the library unit 200, it decides that the transfer of the CM program data from the library unit 200 to the cache unit 300 was not suitably carried out and outputs a signal requesting a second transfer to the library processing unit 210 of the library unit 200.

Further, the cache processing unit 310 performs selection as to which CM program data recorded in the cache of the first cache 340 or the second cache 350 should be transmitted when transmitting CM program data recorded in the cache unit 300. The cache processing unit 310 simultaneously sends reproduction instructions to the first cache 340 and the second cache 350 when a request for transmission of CM program data is input. Then, at that reproduction, it instructs the main switcher 400 to compare the reproduction error rates input from each of the first cache 340 and the second cache 350 via the cache controller 320 and select and transmit the CM program data having a lower error rate.

The cache controller 320 controls the specific operations of each of the portions actually constituting the cache unit 300 based on the instructions input from the cache processing unit 310.

More specifically, it instructs the recording and reproduction of the input data, calculation of the check sum, and detection of the error rate to the first cache 340 and the second cache 350. Also, it outputs the check sum and error rate obtained at the first cache 340 and the second cache 350 to the cache processing unit 310. Further, it outputs a selection signal indicating which cache output of the first cache 340 or the second cache 350 should be transmitted to the main switcher 400.

The distributor 330 divides the CM program data which is input from the CM library 230 of the library unit 200 into two signals and inputs them to both of the first cache 340 and the second cache 350. By this, exactly the same signal is input to the first cache 340 and the second cache 350.

Figure 5:
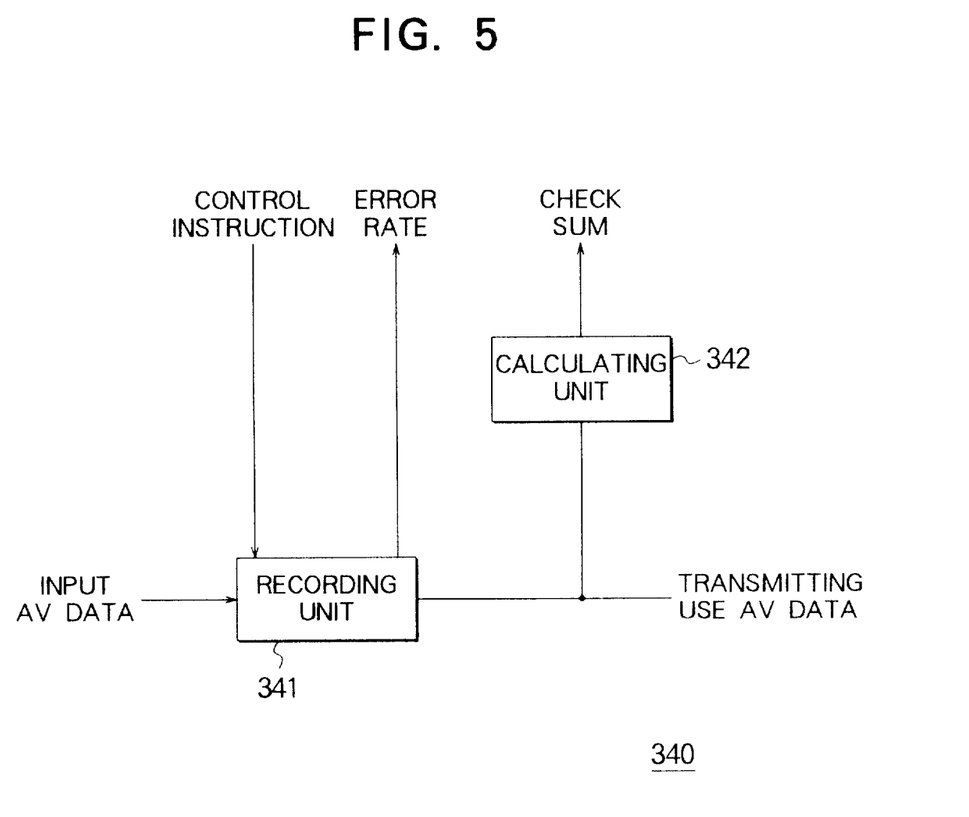
FIG. 5 is a block diagram of the configuration of a first cache shown in FIG. 2.

The first cache 340 and the second cache 350 temporarily record the CM program data scheduled to be transmitted and input from the library 200 through the distributor 330. The first cache 340 comprises a recording unit 341 and a calculating unit 342 as shown in FIG. 5. While not shown, the second cache 350 has the same configuration as the first cache 340 and comprises a recording unit 351 and calculating unit 352.

The first cache 340 and the second cache 350 first receive as input the CM program data actually scheduled to be transmitted from the library unit 200 via the distributor 330 and record it in the recording unit 341 and the recording unit 351, The exact same CM program data is recorded in these two recording units.

The recorded CM program data is immediately test reproduced based on the instructions from the cache controller 320. At the time of this test reproduction, the reproduced CM program data is regarded as numerical data and the calculating units 342 and 352 calculate the check sums for these reproduced CM program data. The obtained check sums are input through the cache controller 320 to the cache processing unit 310 where they are compared against a check sum input from the library unit 200 so as to check if the transferred data is suitable or not.

When the transfer is suitable, the data recorded in the recording units 341 and 352 of the first cache 340 and the second cache 350 are considered valid as the CM program data for transmitting.

When a reproduction instruction for transmitting the transmittable CM program data is input from the cache controller 320, the recording units 341 and 351 reproduce the recorded desired CM program data and output it to the main switcher 400. At this time, the first cache 340 and the second cache 350 detect the reproduction error rate of every predetermined series of data and output the same to the cache controller 320.

Note that, either of the first cache 340 or the second cache 350 acts as the main cache and the other acts as the sub-cache. Usually, at the time of the start-up of the data transmitting apparatus 100, the first cache 340 becomes the main cache and the second cache 350 becomes the sub-cache, but if predetermined conditions occur, this relationship between the main and sub cache may be suitably switched.

Finally, the configuration and function of the main switcher 400 and the input unit 450 will be explained.

The main switcher 400 receives as its inputs the CM program data output from the first cache 340 or the second cache 350 and selects and transmits either of them based on the selection signal from the cache controller 320.

The input unit 450 is an input means for inputting the CM program transmission schedule and transmission requests to the data transmitting apparatus 100. The input unit 450 may be a direct input means such as a keyboard or may be an interface means which receives instructions from other computer or control apparatus etc. and may be of any specific configuration.

Next, an explanation will be made of the operation of the data transmitting apparatus 100 referring to FIG. 6 and FIG. 7. Note that in FIG. 6 and FIG. 7, the solid lines show the flow of the processing and the broken lines show the flow of the data.

First, an explanation will be made of the operation for transferring the CM program data to be transmitted from the library unit to the cache unit 300 with reference to FIG. 6.

Figure 6:
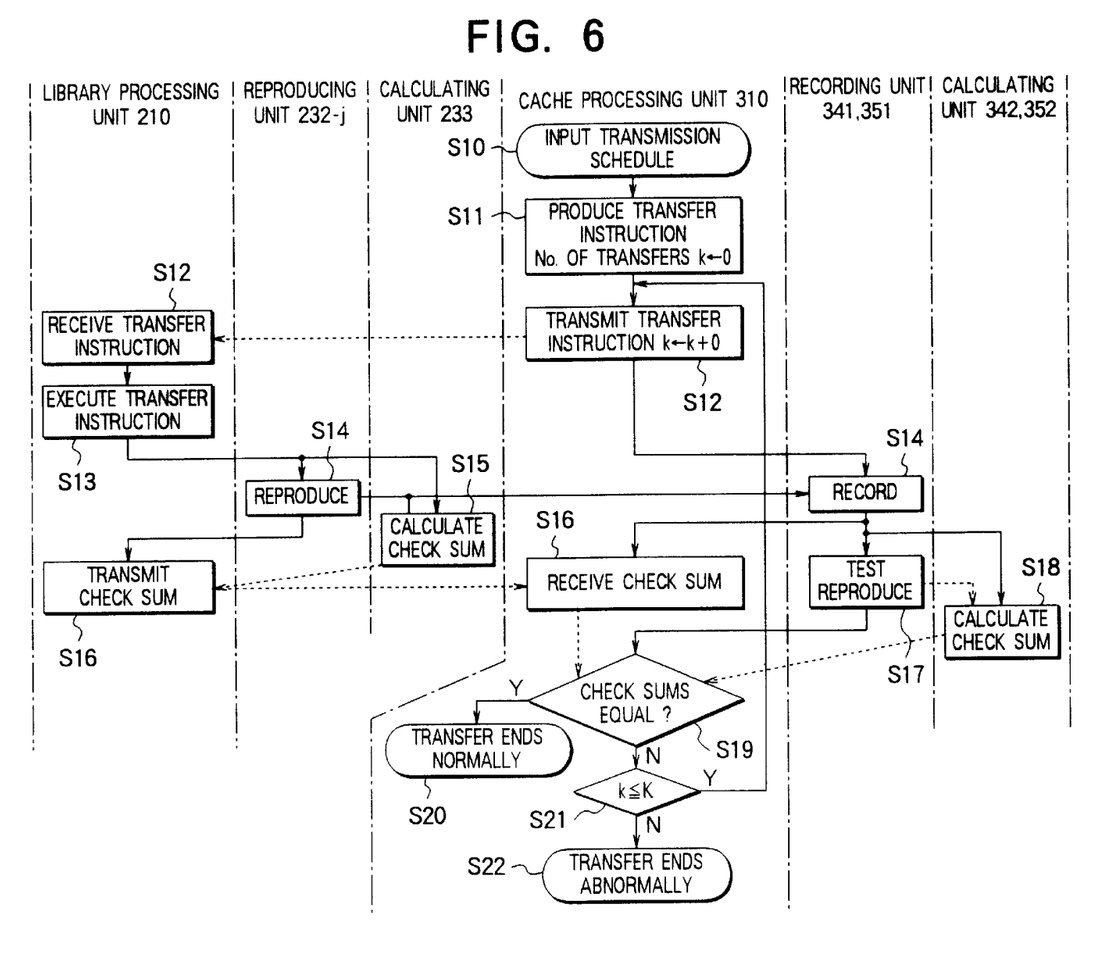
FIG. 6 is a flow chart for explaining the operation of the transfer of AV data inside the data transmitting apparatus shown in FIG. 2.

FIG. 6 is a flow chart showing the flow of processing in each portion in the processing for transferring the transmission use CM program data from the library unit 200 to the cache unit 300.

First, when a CM program transmission schedule is input by an input unit 450 such as a keyboard to the cache processing unit 310 of the cache unit 300 (step S10), the cache processing unit 310 extracts the AV data to be transferred from the library unit 200 to the cache unit 300 as a transmittable state based on the transmission schedule and produces a specific transfer instruction. Also, at this time, it resets the counter for counting the times of transfer k to 0 (step S11).

Further, it inputs the thus produced transfer instruction to the library processing unit 210 of the library unit 200 and starts the transfer of the desired CM program data. At this time, it increases the number of transfers k by 1 (step S12).

The library processing unit 210 controls the library CM library 230 via the library controller 220 and executes the transfer instruction of the requested CM program data (step S13). Namely, the media changer 231 sets the video tape 500-i in which the requested CM program data is recorded in the predetermined reproducing unit 232-j, reproduces that video tape 500-i in the reproducing unit 232-j, and outputs the result to the cache unit 300 via the switcher 234 (step S14). At this time, the calculating unit 233 calculates the check sum regarding the reproduced CM program data as numerical value data and outputs it to the library processing unit 210 through the library controller 220.

The cache unit 300 records the CM program data input from the library unit 200 in both of the first cache 340 and the second cache 350 (step S14).

After the transfer of this CM program data ends, the check sums calculated along with the reproduction of the data are transferred from the library processing unit 210 to the cache processing unit 310 (step S16). Note that this transfer may be performed in a package after the end of the transfer of the CM program data as in this embodiment or may be successively performed in parallel with the transfer of the CM program data.

Further, the cache unit 300 test reproduces the CM program data recorded in the first cache 340 and the second cache 350 (step S17). The cache calculating units 342 and 352 calculate the check sums by the same method as the CM library 230 (step S18).

Then, the cache processing unit 310 compares the check sums obtained by said test reproduction and the check sum input from the library processing unit 210 of the library unit 200. When they are all equal, it is decided that the transfer from the library unit 200 to the cache unit 300 was suitably carried out (step S19) and the series of transfer processings is normally ended (step S20). Due to this, CM program data able to be immediately transmitted in accordance with transmission requests are prepared in the first cache 340 and the second cache 350.

On the other hand, where even one of the check sum of the first cache 340 or the second cache 350 differs from the check sum input from the library processing unit 210, it is decided that the transfer was not suitably carried out (step S19). Further, it finds if the number of transfers k of the transmission requested CM program data is less or equal than a predetermined certain number K (step S21). When less than the predetermined number K, it instructs the copying of the CM program data once again to the library unit 200. That is, it repeats the processing from step S12. Further, when the number of transfers k becomes larger than the predetermined number of transfers K (step S21), the series of processing is abnormally ended considering that some sort of trouble has occurred in the data transmitting apparatus 100 (step S22). Note that in the present embodiment K is made 3. That is, the transfer is attempted three times and when it is not suitably carried out in these three times transfers the transfer processing is abnormally ended.

Next, an explanation will be given of the operation of transmission of the CM program data for which the preparations for transmission were completed referring to FIG. 7.

Figure 7:
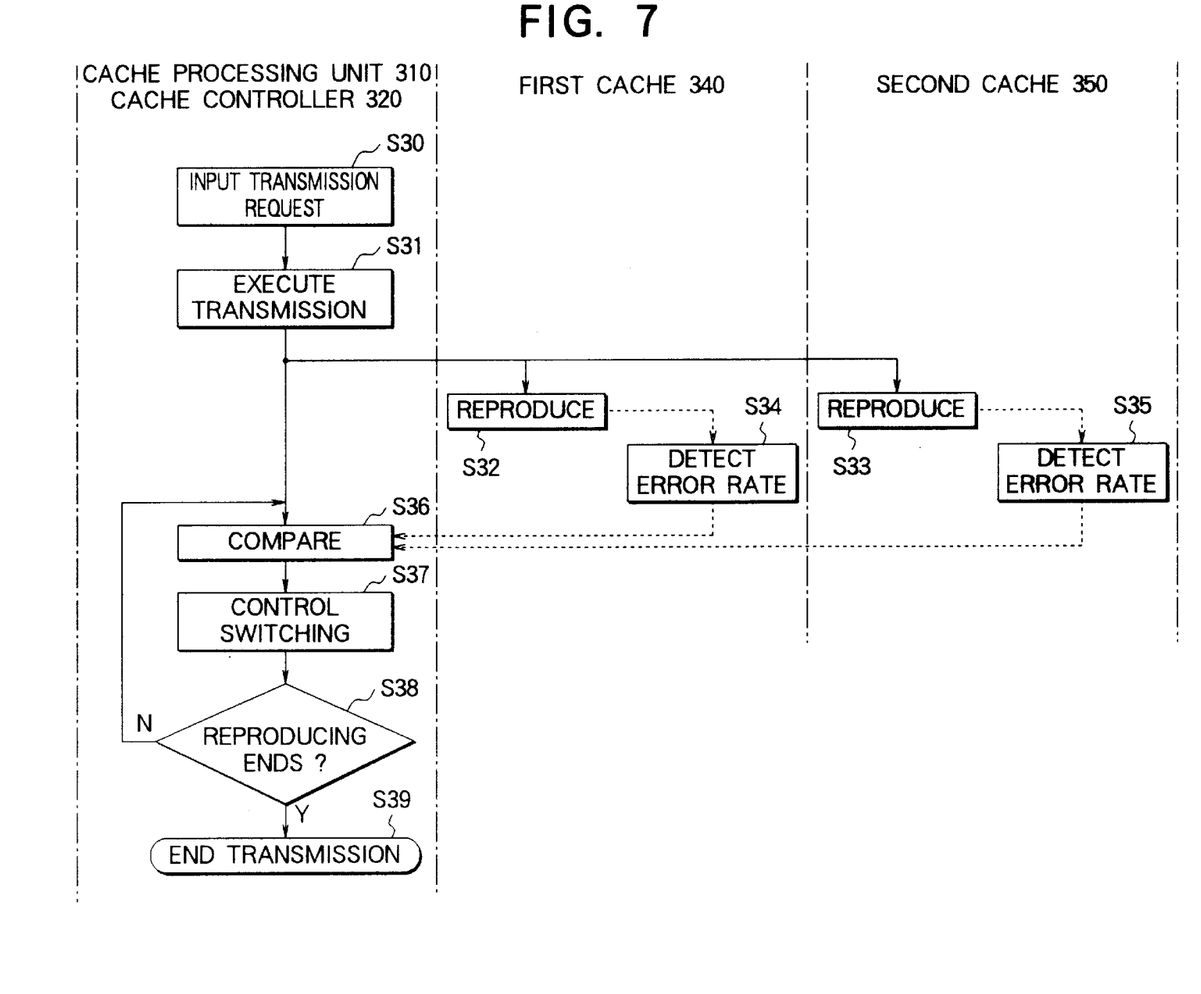
FIG. 7 is a flow chart for explaining the operation of the transmission of AV data by the data transmitting apparatus shown in FIG. 2.

FIG. 7 is a flow chart showing the flow of processing for each portion in the processing for transmitting the transmission use CM program data recorded in the cache unit 300.

In the state where the preparations for transmission of the CM program data have been completed as mentioned above, when a request for transmission of the CM program data is input from the input unit 450, the cache processing unit 310 controls the first cache 340 and the second cache 350 through the cache controller 320 so as to execute the transmission of the CM program data (step S31). That is, the recording unit 341 of the first cache 340 and the recording unit 351 of the second cache 350 simultaneously reproduce the CM program data (steps S32, 33) and transmit them through the main switcher 400. At the time of this data transmission, the first cache 340 and the second cache 350 detect the reproduction error rate for each predetermined unit of data at the same time as the reproduction of the CM program data and output the same through the cache controller 320 to the cache processing unit 310 (steps S34, 35). The cache processing unit 310 compares the error rates input from the two caches (step S36) and outputs a selected signal to the main switch 400 so as to select the output of the cache with the lower, that is, the smaller error rate (step S37). Until the reproduction of the CM program data at the first cache 340 and the second cache 350 is ended (step S38), the each predetermined unit of reproduction error rates are constantly monitored, and the selection processing of the transmission data is repeated. The end of reproduction of the CM program data ends the series of processing for data transmission (step S39).

In this way, the data transmitting apparatus 100, first, when the CM program data is transferred from the library unit 200 to the cache unit 300, decides whether or not the transfer was suitably carried out by using the check sums. Accordingly, it becomes unnecessary for a human operator to view the transferred CM program on a monitor to check the suitability of the transfer and thus the efficiency of the work for transmission of CM programs is improved.

Also, it is possible to detect the error rate for the CM program data respectively reproduced by the first cache 340 and the second cache 350 and select and transmit the CM program data having a smaller error rate by the main switcher 400. Therefore the efficiency becomes very high in comparison with a method wherein the transmission data is constantly checked by a human operator to detect deterioration of the image quality and the outputs of the two systems are switched manually.

Further, the data transmitting apparatus 100 usually transfers the error detection code through the general use interface connecting the computers or computers and terminal equipment etc. separate from the transmission line for transferring the AV data. Accordingly, even if the data transfer system is one which cannot transfer the error detection codes together with the packet of AV data, it is possible to suitably transfer the error detection codes and check the transferred data. The present invention is particularly effective for such a system.

Note that, the data transmitting apparatus of the present invention is not restricted to the present embodiment. Various modifications are possible.

For example, in the library unit 200 and the cache unit 300 of the present embodiment, as means for controlling the processing, the library processing unit 210 and the cache processing unit 310 are provided as the highest layer. As the means for actually performing the control of the constituent units, the library controller 220 and the cache controller 320 were provided. However, these control means are not restricted only to this configuration. For example, it is also possible if the processing units and the controller are integrally constituted or all of them are constituted by a single arithmetic processing apparatus. Note, usually, in specific control, the processing is dependent on hardware and the amount of processing is large, and in the control of the higher units, there is a lot of processing, for example, communication with the other apparatuses or further higher apparatuses. Therefore the configuration of the present embodiment is suitable.

Also, the reproducing unit 232 of the CM library 230 of the present embodiment was constituted by n number of reproducing units 232-1 to 232-n, but the number is not restricted to this. Any configuration can be adopted in accordance with the usage of the data transmitting apparatus 100. For example, when the frequency of transfer of the program data from the library unit 200 to the cache unit 300 is small, it is also possible to constitute the reproducing unit 232 by a single reproducing apparatus. However, in a case when the frequency of use is high, for example, program data is sequentially and successively transferred, a configuration providing two or more reproducing units as in the present embodiment and reducing the overhead time of exchange of the video tapes 500-i is preferred.

Also, in that CM library 230, a configuration providing only one calculating unit 233 for finding the check sum for the n number of reproducing units 232-1 to 232-n is adopted in the present embodiment. Of course, a configuration providing one for each of the reproducing units 232 can be adopted too.

Further, the CM library 230 of the present embodiment comprises a configuration having only the output of one system as the output, but a configuration having outputs of a plurality of systems can be adopted too. At this time, the switcher 234 of the CM library 230 becomes a matrix switcher means and the reproducing unit 232 desirably is constituted by a further larger number of reproduction apparatuses. A data transmitting apparatus of such a configuration is also a modification of the present embodiment. It is clear that the gist of the present invention is applied without change.

Also, the reproduction apparatus 232 of the CM library 230 acts also as a recording apparatus for recording the program data in the video tape 500 in many cases. There is no problem if a configuration using such a recording and reproducing apparatus is adopted.

Also, the recording media to be used in the CM library 230 is not restricted to a cassette tape. Any recording medium can be used. For example, it is also possible to use usual magnetic tape, hard magnetic disks, magneto-optic disks, digital video disk apparatuses, etc.

Moreover, the recording media constituting the first cache 340 and the second cache 350 of the cache unit 300 are not restricted to hard magnetic disk devices. It is also possible to use a usual magnetic tape, magneto-optic disk, digital video disk device, or semiconductor recording apparatus.

Also, in the present embodiment, the suitability of the reproduction and transfer of the CM program data from the library unit 200 to the cache unit 300 and the suitability of the CM program data from the cache unit 300 to the main switcher 400 were determined using a check sum regarding that CM program data as numerical value data. However, the invention is not restricted to this. Any suitable procedure can be adopted. For example, various types of error detection codes, error correction codes, etc. such as a CRC (cyclic redundancy check) or the like which is usually used in transmission etc. can be applied.

Also, in the present embodiment, a system of applying the data transmitting apparatus of the present invention to the transmission of CM programs was explained as an example, but it is clear that the invention can be applied to the transmission of any AV data other than CM programs. Also, the data is not restricted to AV data having audio data and video data. It is also possible if the data has only audio data or only video data and also usual digital data is possible.

According to the data transmitting apparatus of the present invention, the check of the transferred or reproduced AV data can be automatically carried out, and therefore the check of the AV data by the operator can be eliminated or reduced and the work load can be reduced.

INDUSTRIAL APPLICABILITY

The data transmitting apparatus of the present invention can be used for various AV data transmitting apparatuses used in broadcasting stations etc. such as for example automatic transmitting apparatuses for CM programs.

I claim:

1. A data transmitting apparatus comprising:
    a reproducing means for storing audio data and/or video data (AV data) comprised of at least one of video data and audio data and reproducing the stored AV data;
    a temporary recording means for temporarily recording the AV data reproduced by said reproducing means;
    a control means for controlling said reproducing means and said temporary recording means;
    a first error state detecting means for detecting an error state of the AV data reproduced by said reproducing means and outputting a first error detection signal;
    a second error state detecting means for detecting an error state of the AV data reproduced from said temporary recording means and outputting a second error detection signal;

a transfer checking means for detecting that the transfer of the AV data from said reproducing means to said temporary recording means was suitably carried out when said first error detection signal and said second error detection signal are substantially equal; and a data transmitting means for reproducing and transmitting the AV data suitably transferred to and recorded in said temporary recording means.

2. A data transmitting apparatus as set forth in claim 1, wherein when said transfer checking means detects that said first error detection signal and said second error detection signal are different, said control means controls said reproducing means and said temporary recording means so as to again carry out the transfer of said AV data from said reproducing means to said temporary recording means.

3. A data transmitting apparatus as set forth in claim 1, further comprising an input means for inputting transmission scheduling data showing the transmission schedule of said AV data, and said control means controls said reproducing means and said temporary recording means based on said transmission scheduling data so that said data is transferred from said reproducing means to said temporary recording means before the scheduled time of broadcast of said AV data.

4. A data transmitting apparatus as set forth in claim 1, comprising a first transmission line connecting said reproducing means and said temporary recording means and a second transmission line connecting the first error state detecting means and the transfer checking means, and the second error state detecting means and the transfer checking means each, on the first transmission line being transmitted fixed length data packets having a first data portion including the video data for each horizontal line's worth of the video data and a second data portion including the audio data corresponding to the video data and predetermined auxiliary data, and on the second transmission line being transmitted at least said first error detection signal and said second error detection signal.

5. A data transmitting apparatus as set forth in claim 4, wherein said first transmission line is a transmission line which can transmit said AV data by a first transmission rate, and said second transmission line is a transmission line which can transmit said first error detection signal and said second error detection signal at a second transmission rate slower than said first transmission rate.

6. A data transmitting apparatus as set forth in claim 1, wherein said temporary recording means comprises a plurality of recording means, said control means controls said reproducing means and said temporary recording means so that the same data reproduced by said reproducing means is recorded in each of said plurality of recording means, said second error detecting means detects said error state for each of the AV data reproduced from said plurality of recording means and outputs a plurality of second error detection signals, and said transfer checking means detects that the transfer of the AV data from said reproducing means to said temporary recording means has been suitably performed when the first error detection signal and the plurality of second error detection signals are substantially all equal.

7. A data transmitting apparatus as set forth in claim 6, wherein said data transmitting means comprises a data selecting means for selecting and transmitting one series of AV data from a plurality of series of AV data reproduced from said plurality of recording means under the control of said control means.

8. A data transmitting apparatus as set forth in claim 7, wherein said data selecting means comprises an error rate detecting means for detecting the error rates of each of the AV data reproduced from the plurality of recording means and the AV data with the lowest error rate is selected based on the results of detection of said error rate detecting means.

* * * * *